(12) United States Patent
Buravalla

(10) Patent No.: US 11,565,505 B2
(45) Date of Patent: Jan. 31, 2023

(54) LAMINATE ASSEMBLY WITH EMBEDDED CONDUCTIVE ALLOY ELEMENTS

(71) Applicant: GENERAL ELECTRIC COMPANY, Schenectady, NY (US)

(72) Inventor: Vidyashankar Ramasastry Buravalla, Bangalore (IN)

(73) Assignee: General Electric Company, Schenectady, NY (US)

( * ) Notice: Subject to any disclaimer, the term of this patent is extended or adjusted under 35 U.S.C. 154(b) by 137 days.

(21) Appl. No.: 17/016,621

(22) Filed: Sep. 10, 2020

(65) Prior Publication Data
US 2021/0070015 A1    Mar. 11, 2021

(30) Foreign Application Priority Data
Sep. 10, 2019    (IN) .............................. 201911036415

(51) Int. Cl.
*B32B 15/04*    (2006.01)
*B32B 27/06*    (2006.01)
(Continued)

(52) U.S. Cl.
CPC .............. *B32B 15/043* (2013.01); *B32B 5/26* (2013.01); *B32B 27/065* (2013.01); *B32B 27/12* (2013.01);
(Continued)

(58) Field of Classification Search
CPC ............. C22F 1/006; B64C 2001/0072; B32B 7/14; B32B 7/12; B32B 15/02; B32B 15/08; B32B 2311/005; B32B 15/043; B32B 27/065; B32B 27/12; B32B 37/18; B32B 202/56; B32B 5/26; B29L 2009/00; B29K 2105/08; B29C 53/02; B29C 53/086; B29C 53/865; Y10T 428/24132; Y10T 428/23132
(Continued)

(56) References Cited

U.S. PATENT DOCUMENTS 5,614,305 A    3/1997    Paine et al.
5,700,337 A * 12/1997    Jacobs ...................... B32B 7/12
                                                        156/298

(Continued)

FOREIGN PATENT DOCUMENTS

EP    3135473 A1    3/2017

OTHER PUBLICATIONS

Angioni et al, Impact Damage Resistance and Damage Suppression Properties of Shape Memory Alloys in Hybrid Composites, Smart Materials and Structures, Dec. 10, 2010 vol. 20, No. 1., 24 ppg.

*Primary Examiner* — Camie S Thompson
(74) *Attorney, Agent, or Firm* — McGarry Bair PC

(57) ABSTRACT

A laminate assembly includes a matrix layer and elongated, continuous strips of a conductive alloy. The matrix layer has opposite first and second sides connected by opposite first and second edges. Each of the first and second edges extends from the first side of the matrix layer to the opposite second side of the matrix layer. The elongated, continuous strips of the conductive alloy are disposed in the matrix layer between the first and second sides of the matrix layer. The elongated continuous strips continuously extend through the matrix layer from the first edge to the opposite second edge.

19 Claims, 5 Drawing Sheets

(51) Int. Cl.
 *B32B 27/12* (2006.01)
 *B32B 5/26* (2006.01)
 *B32B 37/18* (2006.01)

(52) U.S. Cl.
 CPC ........ *B32B 37/18* (2013.01); *B32B 2307/202* (2013.01); *B32B 2307/56* (2013.01); *B32B 2311/005* (2013.01); *B32B 2605/18* (2013.01)

(58) Field of Classification Search
 USPC .................................. 428/297.4; 174/102 R
 See application file for complete search history.

(56) References Cited

U.S. PATENT DOCUMENTS

| | | |
|---|---|---|
| 6,989,197 B2 | 1/2006 | Schneider |
| 2004/0025985 A1 | 2/2004 | van Schoor et al. |
| 2004/0175555 A1 | 9/2004 | Ogisu |
| 2007/0202296 A1 | 8/2007 | Chandrasekaran et al. |
| 2017/0254208 A1 | 9/2017 | Prince et al. |

\* cited by examiner

LAMINATE ASSEMBLY WITH EMBEDDED CONDUCTIVE ALLOY ELEMENTS

CROSS-REFERENCE TO RELATED APPLICATION(S)

This application claims priority to Indian Application No. 201911036415, filed Sep. 10, 2019, which is incorporated herein by reference its entirety.

FIELD OF INVENTION

The subject matter described herein relates to composite materials, and more particularly to laminate assemblies that include conductive alloy elements.

BACKGROUND

Composite materials typically include fiber-reinforced polymers and exhibit a high strength to weight ratio. Due to the high strength to weight ratio and moldability to adopt relatively complex shapes, composite materials are utilized in various vehicular applications, such as aircraft, space shuttles, automobiles, boats, motorcycles, bicycles, and the like. For example, composite materials can be installed on or define the skin of the fuselage and/or wings, a rudder, a manifold, or other components of an aircraft.

Known composite materials are prone to damage from the impacts of objects, such as debris along a runway (e.g., tires), birds, projectiles (e.g., bullets), dropped tools during manufacturing or maintenance stages, hail, and the like. For example, the known composite materials may not provide sufficient deformation in response to object impacts to absorb the impact energy without causing damage to the composite material, such as delamination, cracking, breakage of fibers, and/or the like. To mitigate the risk of such impact damage to the composite materials, the vehicular components that include composite materials may incorporate excess material into the laminated composite stack beyond the amount that is necessary to provide a designated amount of load bearing. The incorporation of excess material into the laminated composite stack may undesirably increase component costs and weight, particularly for aerospace applications. Frequent inspections of the vehicular components may also be ordered to attempt to detect signs of impact damage to the composite materials, which may undesirably increase maintenance and repair costs, as well as reduce the time that the vehicle is in service.

SUMMARY

In one or more embodiments, a laminate assembly is provided that includes a matrix layer and elongated, continuous strips of a conductive alloy. The matrix layer has opposite first and second sides connected by opposite first and second edges. Each of the first and second edges extends from the first side of the matrix layer to the opposite second side of the matrix layer. The elongated, continuous strips of the conductive alloy are disposed in the matrix layer between the first and second sides of the matrix layer. The elongated continuous strips continuously extend through the matrix layer from the first edge to the opposite second edge.

In one or more embodiments, a method of creating a laminate assembly is provided that includes disposing elongated, continuous strips of a conductive alloy in a resin material. The method also includes solidifying the resin material to form a matrix layer having opposite first and second sides connected by opposite first and second edges. Each of the first and second edges extends from the first side of the matrix layer to the opposite second side of the matrix layer. The elongated, continuous strips of the conductive alloy are disposed between the first and second sides of the matrix layer and continuously extend through the matrix layer from the first edge to the opposite second edge.

In one or more embodiments, a laminate assembly is provided that includes a matrix layer and non-planar elements of a shape memory alloy. The matrix layer has a thickness that extends from a first side of the matrix layer to a second side of the matrix layer that is opposite the first side. The non-planar elements of the shape memory alloy are disposed in the matrix layer between the first and second sides of the matrix layer. The non-planar elements of the shape memory alloy are coiled and/or curved to absorb energy of one or more impacting bodies striking the matrix layer.

BRIEF DESCRIPTION OF THE DRAWINGS

The present inventive subject matter will be better understood from reading the following description of non-limiting embodiments, with reference to the attached drawings, wherein below.

DETAILED DESCRIPTION

The embodiments described herein provide a laminate assembly that includes composite materials for enhancing the ability of the laminate assembly to withstand mechanical impacts, vibration, electric current, heat, and/or the like, relative to known composite materials and structures. As a result, the laminate assembly disclosed herein may have a longer operating lifetime and/or request less frequent inspections and repairs. The laminate assembly includes conductive alloy elements embedded within at least one matrix layer. The conductive alloy elements may be formed of a shape memory alloy. The conductive alloy elements are configured to passively absorb energy from impact forces.

The conductive alloy elements may also provide additional benefits, such as vibration absorption and dissipation, electric current conduction paths through the laminate assembly, thermal energy (e.g., heat) conduction paths through the laminate assembly, and/or the like. For example, the conductive alloy elements may provide lightning protection by conducting electric currents absorbed by the laminate structure out of the laminate structure to a component that is configured to dissipate the current. The conductive alloy elements may also conduct absorbed thermal energy out of the laminate structure to a heat sink, heat exchanger, active cooling device, or the like to dissipate the heat from the laminate structure.

Figure 1:
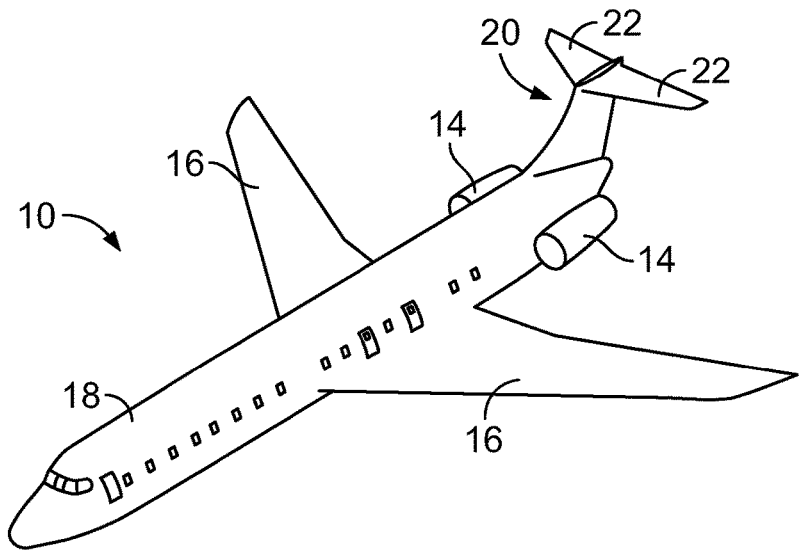
FIG. 1 illustrates a front perspective view of an aircraft.

FIG. 1 illustrates a front perspective view of an aircraft 10. The aircraft 10 may be a commercial airliner that is used to fly passengers and cargo between different cities. The aircraft 10 includes two turbofan engines 14 that generate propulsion. The engines 14 are carried by a fuselage 18 of the aircraft 10. In other embodiments, the engines 14 may be carried by the wings 16 and/or an empennage 20. The empennage 20 includes one or more stabilizers 22 or rudders. The fuselage 18 of the aircraft 10 may define an interior cabin and a cargo bay. To improve fuel efficiency by reducing weight, components of the aircraft 10 along the fuselage 18, wings 16, and/or empennage 20 may include composite material structures composed of a laminate assembly described herein. For example, the laminate assembly may be installed as a component of an outer skin of the fuselage 18, wings 16, and/or empennage 20. The outer skin defines the outer surface that is exposed to environment conditions, such as precipitation, wind, solar energy, impacts from external objects (e.g., debris along the ground, projectiles, birds, etc.), lightning strikes, and the like. The laminate assembly described herein is designed to resist these environmental conditions without suffering damage in the form of cracking, tearing, piercing, delaminating, or the like. For example, the laminate assembly described herein includes embedded conductive alloy elements within a matrix layer that may provide 10 improved impact resistance over known composite material structures.

Although FIG. 1 shows an aircraft, it is recognized that the laminate assembly described herein may be utilized on other types of vehicles, such as helicopters and other flying vehicles, automobiles, motorcycles, marine vessels, bicycles, trucks, off-highway vehicles, and the like. The laminate assembly can also be utilized in non-vehicular applications, such as parts of buildings and other stationary, free-standing structures, sporting goods, home goods, and the like.

Figure 2:
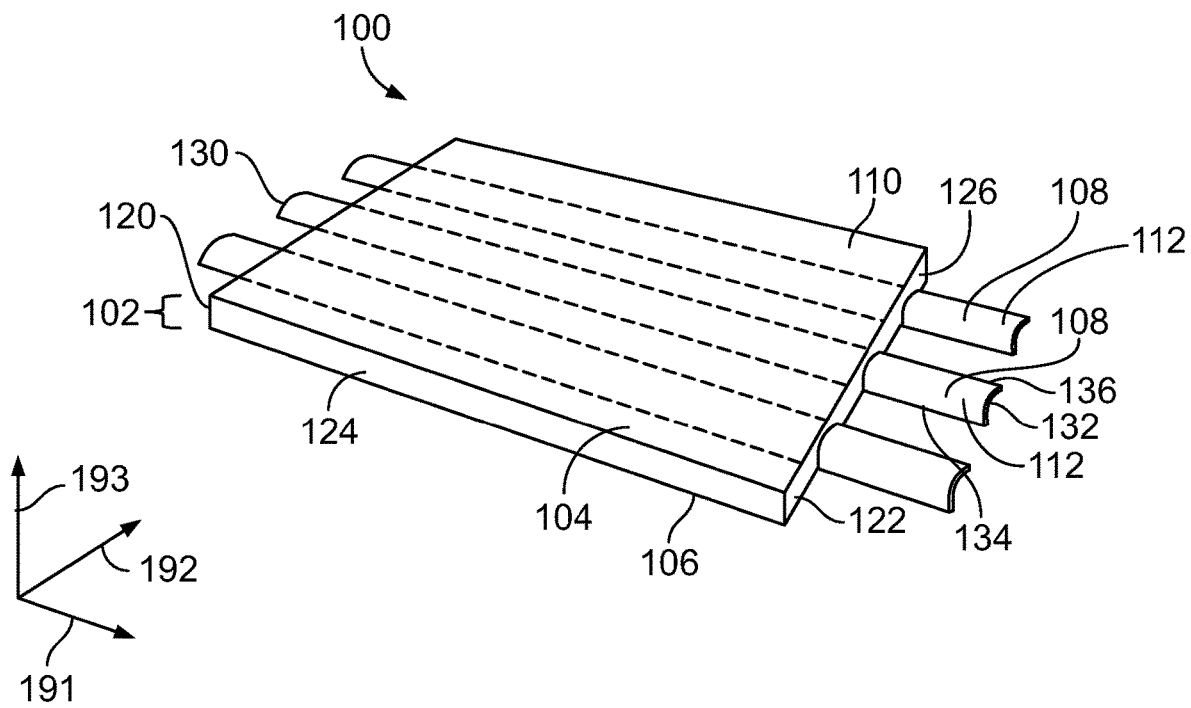
FIG. 2 is a perspective view of a laminate assembly that includes a matrix layer according to an embodiment.

FIG. 2 is a perspective view of a laminate assembly 100 according to an embodiment. The laminate assembly 100 optionally may be disposed on an aircraft (e.g., the aircraft 10 shown in FIG. 1), another type of vehicle, or a non-vehicular application. The laminate assembly 100 includes a matrix layer 102. The matrix layer 102 may represent one of multiple discrete layers that are stacked together to define the laminate assembly 100. For example, the matrix layer 102 may be stacked with other matrix layers having a similar composition as the matrix layer 102 and/or with other layers having a different composition than the matrix layer 102. The multiple layers may be cured to form a monolithic, unitary (e.g., one-piece) laminate assembly 100. One or more of the layers may be reinforced with embedded fibers.

The matrix layer 102 has a thickness that extends from a first side 104 of the matrix layer 102 to a second side 106 of the matrix layer 102. The second side 106 is opposite the first side 104. The first and second sides 104, 106 may be planar or curved, depending on the application. The matrix layer 102 is oriented along three orthogonal directions (e.g., dimensions, axes, etc.) that are mutually perpendicular. The three orthogonal directions include a length direction 191, a width direction 192, and a height direction 193.

The matrix layer 102 extends a length in the length direction 191 from a first edge 120 of the matrix layer 102 to a second edge 122 of the matrix layer 102 opposite the first edge 120. The matrix layer 102 extends a width in the width direction 192 from a third edge 124 of the matrix layer 102 to a fourth edge 126 of the matrix layer 102 opposite the third edge 124. Each of the first, second, third, and fourth edges 120, 122, 124, 126 extends from the first side 104 to the second side 106. The first and second sides 104, 106 are therefore connected by the edges 120, 122, 124, 126. The thickness of the matrix layer 102 extends in the height direction 193. In the illustrated embodiment, the matrix layer 102 is relatively thin such that the length and width of the matrix layer 102 are substantially greater (e.g., more than 2× greater, more than 5× greater, more than 8× greater, or the like) than the thickness of the matrix layer 102.

The matrix layer 102 includes multiple conductive alloy elements 108 20 embedded in a binder 110. In one or more embodiments the elements 108 are non-planar, such as curved (e.g., bowed), conical, or coiled. The binder 110 may hold the conductive alloy elements in fixed positions within the matrix layer 102. The binder 110 may be formed from (e.g., composed of) a thermosetting material that hardens from a flowable state to a solid state in response to a heat application. The thermosetting material may be a resin material, such as an epoxy resin. Optionally, the binder 110 may be formed from a different type of material other than a resin, such as a foam material. The foam material may represent a fiber-based honeycomb structure, such as Nomex®, a vinyl foam, a polyurethane foam, or other polymer foam material.

The conductive alloy elements 108 are embedded in the thickness of the matrix layer 102 between the first and second sides 104, 106. The conductive alloy elements 108 optionally may be spaced apart from both the first and second sides 104, 106 within the interior thickness of the matrix layer 102 such that the first and second sides 104, 106 are defined by the binder 110.

In the illustrated embodiment, the conductive alloy elements 108 are elongated, continuous strips 112. The strips 112 continuously extend through the matrix layer 102 from the first edge 120 to the opposite second edge 122. Optionally, one or more of the strips 112 may project beyond the first edge 120 and/or beyond the second edge 122 such that at least a segment of the one or more strips 112 may be located outside of the matrix layer 102. The strips 112 are elongated along the length direction 191. The strips 112 may be oriented parallel to each other and disposed side by side in a row. Optionally, adjacent strips 112 in the row are spaced apart from one another by intervening portions of the binder 110.

Each of the strips 112 extends a length (along the length direction 191) from a first end 130 of the respective strip 112 to an opposite second end 132 of the respective strip 112. The strips 112 are continuous such that there are no seams or breaks in the strips 112 along the lengths. Each strip 112 extends a width (along the width direction 192) from a first edge 134 of the respective strip 112 to an opposite second edge 136 of the respective strip 112. The strips 112 may be significantly greater in length than width. The strips 112 may be significantly greater in both length and width than in thickness (along the height direction 193). Therefore, the width of the strips is significantly greater than the thickness, as opposed to other known shapes such as wires. In an embodiment, each of the strips 112 may be composed of a single unitary, monolithic element, as opposed to bundles or tows of multiple wires grouped together.

In one or more embodiments, the conductive alloy that forms the strips 112 is a shape memory alloy. The shape memory alloy may provide stress and/or strain properties for the laminate assembly 100 that enable the laminate assembly 100 to absorb energy from vibrations and impact forces. The shape memory alloys are characterized by inherent hysteretic responses of martensitic twinning (e.g., the shape memory effect) and martensitic transformation (e.g., superelasticity). The specific type of the shape memory alloy may be selected and/or formulated to provide desired hysteretic response within an expected range of operating temperatures associated with a desired application. Non-limiting examples of possible shape memory alloys used to form the strips 112 include Ni—Ti (e.g., nitinol), Ni—Ti—Nb, Ni—Ti—Cu, Cu—Zn—Al, Cu—Al—Ni, Fe—Mn—Si, or the like.

Although the strips 112 may be formed of a shape memory alloy that can 15 change shape based on temperature and/or electromagnetic fields, the strips 112 may be passive in the matrix layer 102. For example, the strips 112 may not change shape within the matrix layer 102 in response to temperature changes, and the laminate assembly 100 may lack any means for selectively applying an electric current to the strips 112. Thus, the shape memory alloy strips 112 may not be used to selectively impart motion or apply a force.

The elongated, continuous strips 112 within the matrix layer 102 are configured to absorb energy of one or more impacting bodies striking the matrix layer 102, either directly or indirectly. For example, when the laminate assembly 100 is installed along the outer skin of an aircraft, such that the aircraft 10, the laminate assembly 100 may receive impact forces from debris, machines, and workers along a runway and/or within a production facility during assembly and/or maintenance of the aircraft. The debris may include tires, dropped tools, and other objects. The laminate assembly 100 may also receive impacts from birds and precipitation (e.g., hail) during flight. The strips 112 within the matrix layer 102 absorb energy from the impacting bodies (e.g., birds, tools, tires, hail, and the like) to prevent the impacting bodies from passing through the matrix layer 102. The characteristics of the shape memory alloy and the dimensions and placement of the strips 112 may provide the strength and energy damping to withstand the impacting bodies without damaging the laminate assembly 100. For example, the matrix layer 102 may absorb the energy from the impacting bodies without cracking, tearing, delaminating, or the like.

The elongated strips 112 within the matrix layer 102 may also provide other 10 benefits during operation, such as lightning protection, energy conduction, and vibration damping. For example, the strips 112 are electrically conductive and continuously extend through the matrix layer 102 between the first and second edges 120, 122 of the matrix layer 102. If electric current is absorbed by the matrix layer 102, such as due to a lightning strike on the aircraft, the conductive strips 112 provide electrically conductive paths for conducting the electric current that is absorbed. In the illustrated embodiment, the strips 112 exit the matrix layer 102 by projecting beyond the first and second edges 120, 122. The strips 112 may conduct the electric current to a location outside of the matrix layer 102. For example, one or both ends 130, 132 of the strips 112 may be electrically connected to a device configured to dissipate electric current. By conducting the electric current outside of the matrix layer 102, the strips 112 may reduce damage to the laminate assembly 100 caused by lightning strikes and other sources of electric current. The strips 112 are also thermally conductive, and may provide conductive paths for conducting heat that is absorbed by the matrix layer 102. For example, the strips 112 may conduct thermal energy absorbed by the matrix layer 102 to a location outside of the matrix layer 102, such as to a heat sink. The strips 112 of the shape memory alloy may also absorb vibrations of the matrix layer 102.

In an alternative embodiment, the conductive alloy of the elongated strips 112 may be formed of an alloy other than a shape memory alloy. In another alternative embodiment, the strips 112 may be arranged differently than parallel and spaced-apart in a row. For example, the strips 112 may be immediately adjacent to one another or even overlapping such that the strips 112 are not spaced apart. In another example, at least some of the strips 112 may not be parallel to other strips 112 in the same matrix layer 102. For example, a first subset of strips 112 may be transverse to a second subset of strips 112, such as orthogonal, to define a mesh of strips 112.

Figure 3:
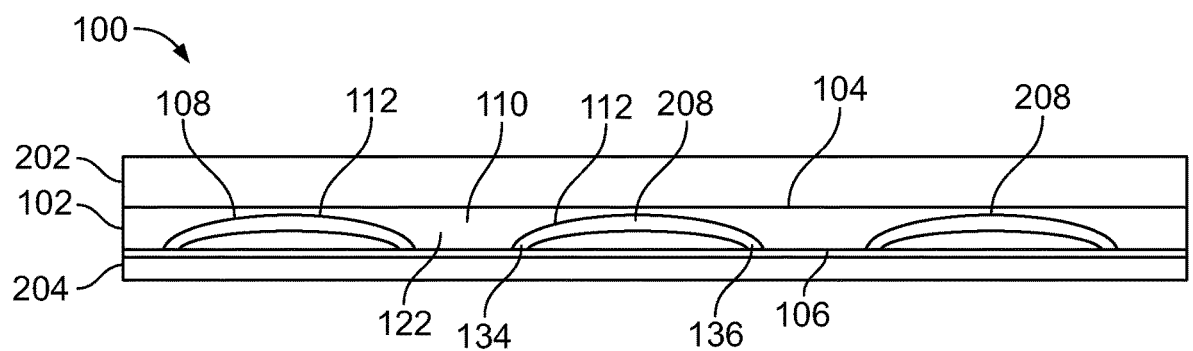
FIG. 3 is an end view of the laminate assembly including the matrix layer shown in FIG. 2.

FIG. 3 is an end view of the laminate assembly 100 including the matrix 10 layer 102 shown in FIG. 2. The end view shows the second edge 122 of the matrix layer 102. The laminate assembly 100 includes multiple layers stacked on one another to define a thickness of the laminate assembly 100. For example, a first layer 202 is disposed on the first side 104 of the matrix layer 102. A second layer 204 is disposed on the second side 106 of the matrix layer 102, such that the matrix layer 102 is sandwiched between the first and second layers 202, 204. The first layer 202 and/or the second layer 204 may be a fiber-reinforced polymer or fabric that includes fibers embedded therein. The fibers may be carbon fibers, glass fibers, aramid fibers (e.g., Kevlar®), basalt fibers, naturally-occurring biological fibers such as bamboo, and/or the like. In the illustrated embodiment, the matrix layer 102 includes the binder 110 and the strips 112 of conductive alloy and lacks fibers. Fiber-reinforced layers may be located on one or both sides of the matrix layer 102. Although the laminate assembly 100 includes three layers 202, 102, 204 in FIG. 3, it is recognized that this illustrated laminate assembly 100 may represent a subset or sub-laminate or a greater composite structure. For example, the composite structure may include multiple matrix layers like the matrix layer 102 in a stack spaced apart by intervening fiber-reinforced layers and/or the like.

Optionally, the first layer 202 and/or the second layer 204 may be a metal sheet, such as aluminum, an aluminum alloy, or the like. For example, the first layer 202 may be a metal sheet that defines the outer surface or skin of an aircraft. The elongated, continuous strips 112 of the conductive alloy within the matrix layer 102 may absorb energy from impacting bodies, such as birds, hail, tires, tools, and debris, that strike the first layer 202. The second layer 204 on the other side of the matrix layer 102 may be a fiber-reinforced polymer or fabric.

In one or more embodiments, at least some of the conductive alloy elements 108 within the matrix layer 102 are curved or coiled to absorb and dissipate energy like 10 a spring. In FIG. 3, the strips 112 of conductive alloy are curved to bow toward the first side 104 of the matrix layer 102. The strips 112 are bowed along the width of the strips 112.

Figure 4:
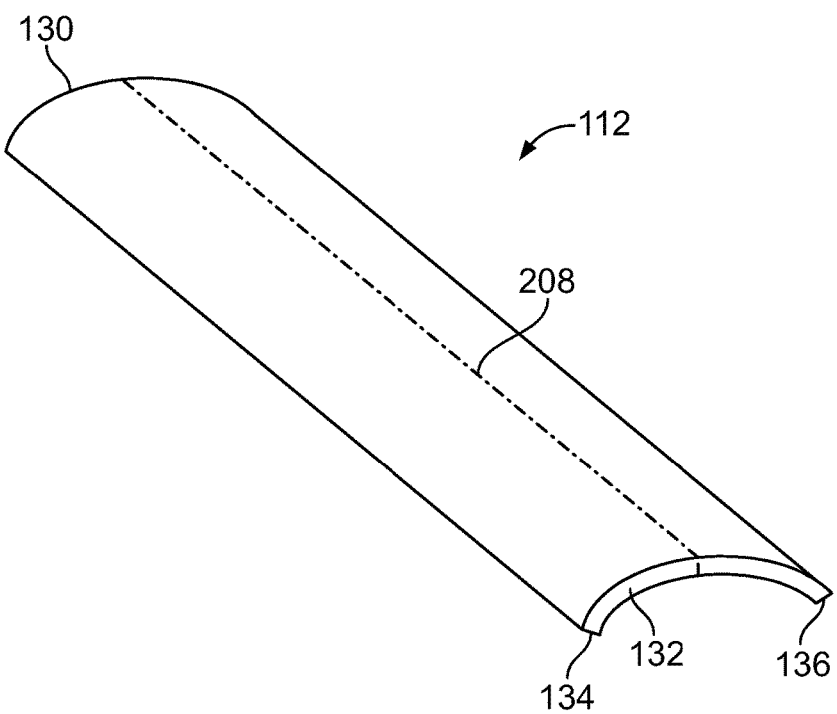
FIG. 4 is an isolated perspective view of an elongated, continuous strip of conductive alloy within the matrix layer shown in FIGS. 2 and 3.

FIG. 4 is an isolated perspective view of one of the elongated, continuous strips 112 of conductive alloy within the matrix layer 102 shown in FIGS. 2 and 3. Referring to both FIGS. 3 and 4, the strips 112 include a midline 208 located halfway between the first edge 134 and the second edge 136 of each respective strip 112. The midline 208 extends along the length of the strip from the first end 130 thereof to the second end 132 thereof. Due to the bowed curvature of the strips 112, the midline 208 of each strip 112 is on a different plane than the first and second edges 134, 136. The first and second edges 134, 136 optionally may be on the same plane as each other. The midline 208 of each strip 112 is located closer to the first side 104 of the matrix layer 102 than a proximity of the first and second edges 134, 136 of the respective strip 112 to the first side 104. Conversely, the first and second edges 134, 136 are located closer to the second side 106 of the matrix layer 102 than a proximity of the midline 25 208 to the second side 106. The strips 112 optionally may be inverted within the matrix layer 102 from the illustrated orientation such that the midlines 208 are located closer to the second side 106 of the matrix layer 102 than the edges 134, 136. Although the binder 110, which may be a rigid resin material, may restrict the strips 112 from substantial deflection and compression (e.g., noticeable with the naked eye) when struck by an impacting body, the curvature of the strips 112 enable the strips 112 to absorb and dissipate (e.g., dampen) energy received in the matrix layer 102 from the impacting body.

Figure 5:
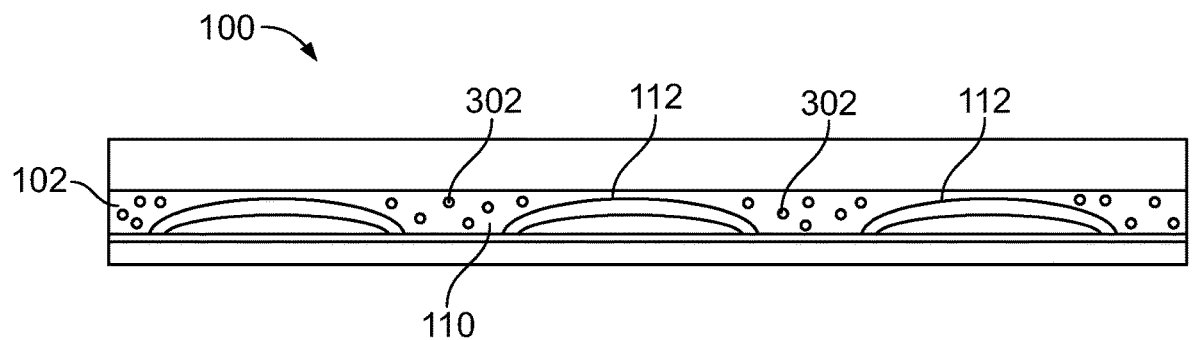
FIG. 5 is an end view of the laminate assembly according to an alternative embodiment.

FIG. 5 is an end view of the laminate assembly 100 according to an alternative embodiment. The matrix layer 102 in the illustrated embodiment includes both the elongated, continuous strips 112 of conductive alloy and fibers 302 disposed in the matrix layer 102. The fibers 302 may be carbon fibers, glass fibers, aramid fibers (e.g., Kevlar®), basalt fibers, naturally-occurring biological fibers such as bamboo, and/or the like. The fibers 302 may be elongated wires. In the illustrated embodiment, the fibers 302 that are visible are oriented parallel to the strips 112 and only the ends are shown. Optionally, some of the fibers 302 within the matrix layer 102 may be oriented transverse to the orientation of the strips 112. The fibers 302 are embedded within the binder 110 with the strips 112. The fibers 302 may be disposed within the intervening areas between adjacent strips 112. Optionally, the fibers 302 may be more evenly dispersed within the binder 110 than shown in FIG. 5 and may be located above and/or below the strips 112 in addition to being between the strips 112. The fibers 302 may provide additional strength to the matrix layer 102.

Figure 6:
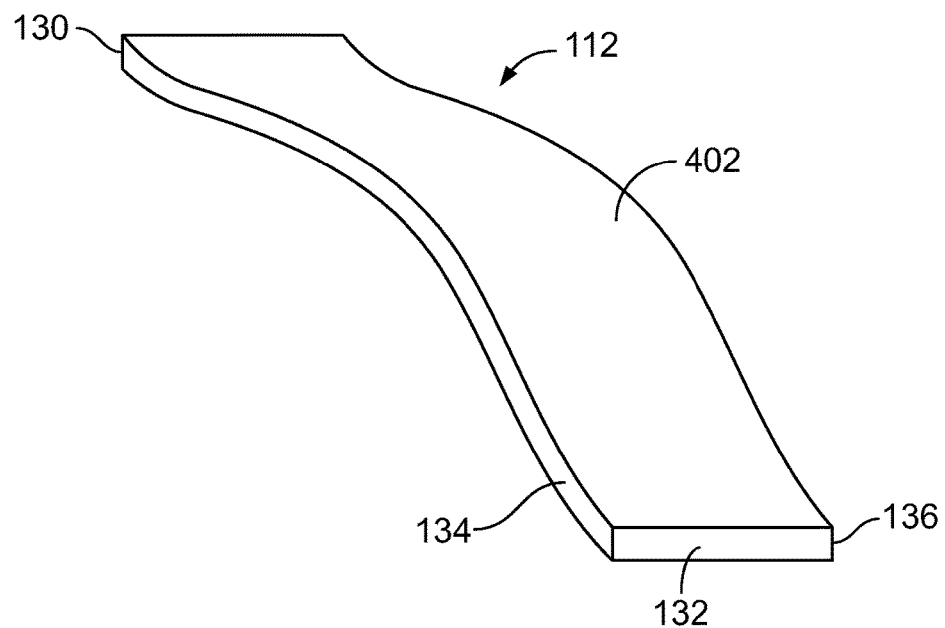
FIG. 6 is an isolated perspective view of the elongated, continuous strip of conductive alloy within the matrix layer according to an alternative embodiment.

FIG. 6 is an isolated perspective view of one of the elongated, continuous strips 112 of conductive alloy within the matrix layer 102 according to an alternative embodiment. The strip 112 shown in FIG. 6 may be embedded within the matrix layer 102 of the embodiment shown in FIGS. 2 and 3 or the embodiment shown in FIG. 5. The strip 112 in the illustrated embodiment is bowed along the length of the strip 112 between the first and 130 and the second end 132. The strip 112 has a middle segment 402 located halfway between the first end 130 and the second end 132. The strip 112 is bowed along the length such that the middle segment 402 is on a different plane than the first end 130 and the second end 132. For example, when embedded in the matrix layer 102, the middle segment 402 may be located closer to the first side 104 of the matrix layer 102 than a proximity of the first end 130 and the second end 132 to the first side 104. The strip 112 optionally may be inverted in the matrix layer 102 such that the middle segment 402 is located closer to the second side 106 of the matrix layer 102 than the proximity of the first and second ends 130, 132 to the second side 106. The ends 130, 132 of the strip 112 optionally may be planar (e.g., flat). Being bowed along the length, the strip 112 in FIG. 6 functions like a leaf spring to absorb and dissipate (e.g., dampen) energy received in the matrix layer 102. Optionally, all of the elongated strips 112 in the matrix layer 102 may be sized and shaped like the strip 112 shown in FIG. 6. Alternatively, some of the strips 112 may be bowed along the length and other strips 112 may be bowed along the width, as shown in FIGS. 2 through 5.

In an alternative embodiment, the elongated, continuous strips 112 of conductive alloy may not be bowed or curved, but rather are planar and flat within the matrix layer 102. For example, the ends 130, 132 and the edges 134, 136 of a given strip 112 may be disposed along the same plane.

Figure 7:
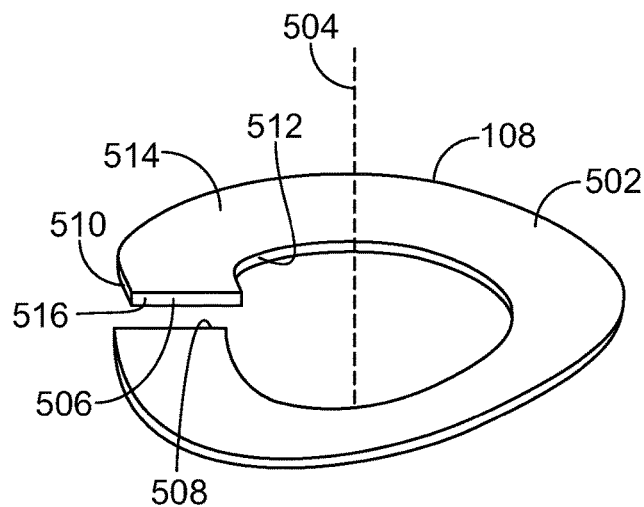
FIG. 7 is an isolated perspective view of a conductive alloy element of the matrix layer according to an alternative embodiment in which the element is a coil spring.

FIG. 7 is an isolated perspective view of one of the conductive alloy elements 108 of the matrix layer 102 according to an alternative embodiment. Instead of being an elongated strip, the element 108 is a coil spring 502 that is helically oriented along a central axis 504. The coil spring 502 is coiled around the central axis 504. The coil spring 502 extends from a first end 506 to a second end 508 opposite the first end 506. In the illustrated embodiment, the spring 502 has one coil (e.g., makes one full rotation), but the spring 502 may have more or less coils in other embodiments. The matrix layer 102 may include an array of such coil springs 502 embedded within the binder 110. The coil springs 502 in the matrix layer 102 may be oriented such that the respective central axes 504 are transverse, such as orthogonal, to the first and second sides 104, 106 of the matrix layer 102. Like the bowed strips 112, the coil springs 502 may absorb energy within the matrix layer 102 attributable to impacts and vibrations. The spring 502 optionally may be strip-like, such that the length (between the two ends 506, 508) and the width (between opposite first and second edges 510, 512) are both 5 substantially greater than a thickness of the spring 502 (between opposite first and second sides 514, 516).

Figure 8:
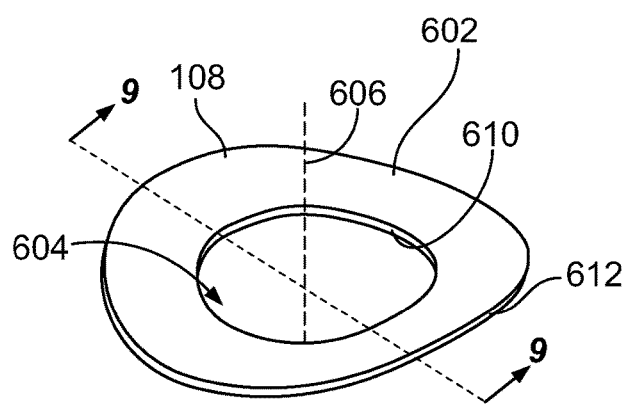
FIG. 8 is an isolated perspective view of a conductive alloy element of the matrix layer according to another alternative embodiment in which the element is a disc spring.
Figure 9:
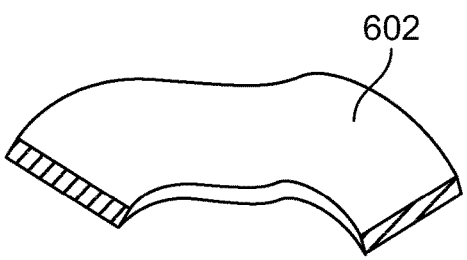
FIG. 9 shows a cross-section of the disc spring taken along line 9-9.

FIG. 8 is an isolated perspective view of one of the conductive alloy elements 108 of the matrix layer 102 according to another alternative embodiment. The element 108 in FIG. 8 is a disc spring (e.g., spring washer, Belleville washer) 602. The disc spring 602 is a closed shape that defines a central opening 604. FIG. 9 shows a cross-section of the disc spring 602 taken along line 9-9 in FIG. 8. The disc spring 602 is non-planar and exists in multiple planes. In the illustrated embodiment, the disc spring 602 is curved in a wave-like effect along the annular length around the central opening 604. For example, the two flat portions of the disc spring 602 segmented by the line 9-9 have different orientations or slopes. The disc spring 602 is oriented about a central axis 606 that extends through the central opening 604. Optionally, instead of the wave-like shape shown, the disc spring 602 may have a conical shape such that an inner annular edge 610 that defines central opening 604 is disposed along a first plane, and an outer annular edge 610 that defines the perimeter of the disc spring 602 is disposed along a different, second plane.

Figure 10:
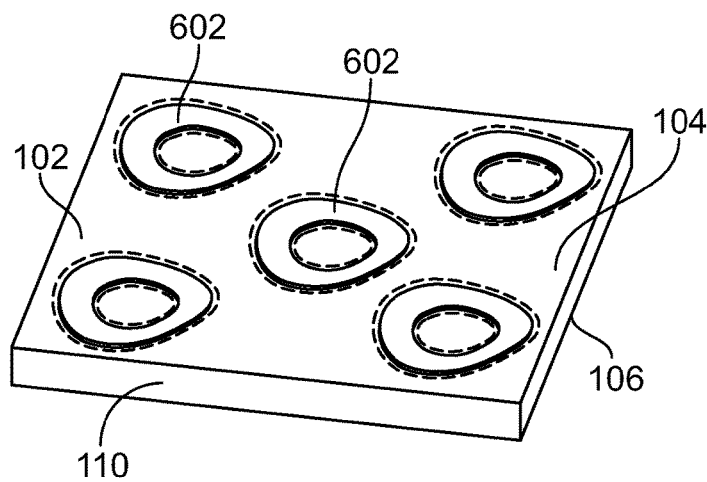
FIG. 10 is a perspective view showing multiple disc springs disposed in the matrix layer according to an embodiment.

FIG. 10 is a perspective view showing multiple disc springs 602 disposed in the matrix layer 102 according to an embodiment. The disc springs 602 are embedded in the binder 110 between the first and second sides 104, 106 of the matrix layer 102. The disc springs 602 may be spaced apart from one another in an array or pattern. Although not shown in FIG. 10, the matrix layer 102 may be reinforced with fibers that are interspersed among the disc springs 602. Like the strips 112 and the coil springs 502, the disc springs 602 absorb energy within the matrix layer 102 attributable to impacts and vibrations.

Figure 11:
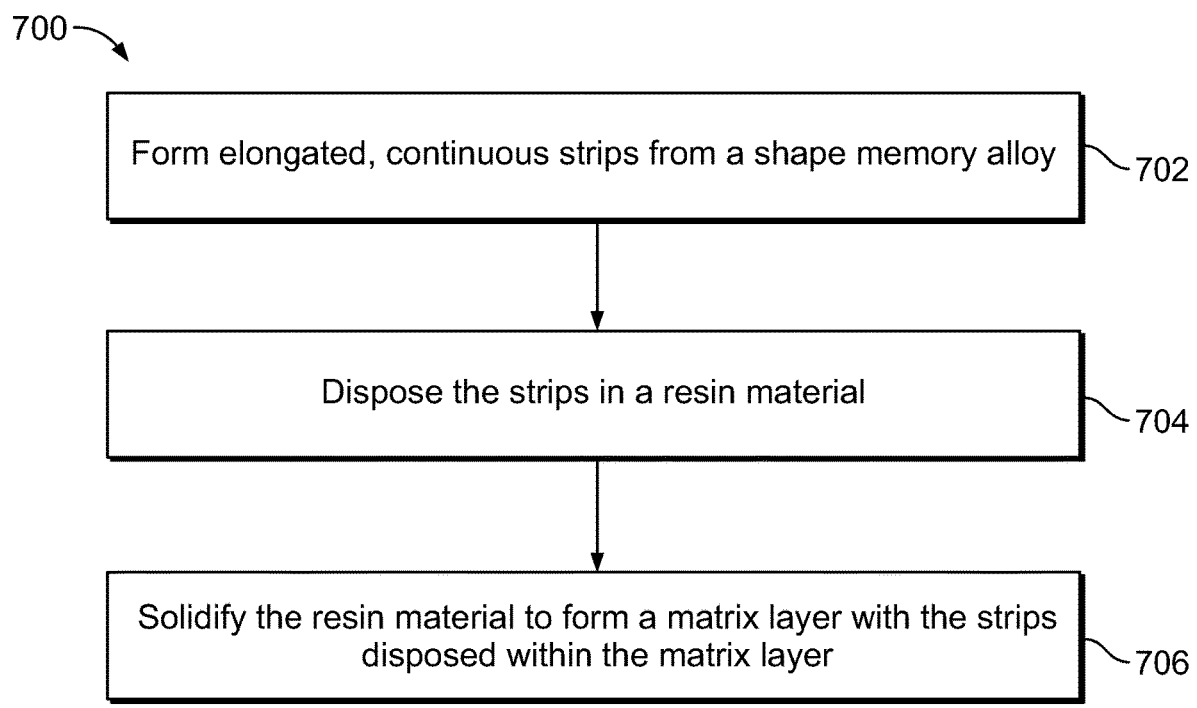
FIG. 11 is a flow chart for a method of creating a laminate assembly

FIG. 11 is a flow chart for a method 700 of creating a laminate assembly according to an embodiment. The method 700 may be performed to produce the laminate assembly 100 described with reference to FIGS. 1 through 10. Optionally, the method 700 may include additional steps not shown in FIG. 11, fewer steps than shown in FIG. 11, and/or the steps may be performed in a different order than shown in FIG. 11. At 702, elongated, continuous strips of a conductive alloy are formed from a shape memory alloy. The shape memory alloy may be Ni—Ti (e.g., nitinol), Ni—Ti—Nb, Ni—Ti—Cu, Cu—Zn—Al, Cu—Al—Ni, Fe—Mn—Si, or the like. The strips may be significantly longer in first and second orthogonal directions (e.g., length and width) than in a third orthogonal direction (e.g., thickness/height).

At 704, the elongated, continuous strips of the shape memory alloy are disposed in a resin material, such as an epoxy resin. The strips may be placed in contact with the resin material while the resin material is in a flowable state. The strips may be dipped in or dragged through the resin material, or the resin material may be poured, sprayed, or otherwise deposited on the strips. Optionally, the strips may be disposed in the resin material in a curved state such that at least one of the strips is bowed along the length and/or width of the strip. The curved state of the strips may enable the strips to absorb energy from impact forces and/or vibrations.

At 706, the resin material is solidified to form a matrix layer with the strips disposed within the matrix layer. The resin material may be solidified due to the application of heat and/or pressure, such as via a curing process. Upon solidifying the resin material, the matrix layer has a first side and a second side opposite the first side. The matrix layer also has first and second edges that extend from the first side to the second side. The strips are held between the first and second sides of the matrix layer. The strips continuously extend through the matrix layer from the first edge to the opposite second edge. Optionally, the strips may be deposited in the resin material such that at least one end of a strip extends outside of the matrix layer beyond the first edge and/or the second edge. The protruding end(s) outside the matrix layer may be electrically connected to an external conductive component. The strips may be 5 configured to conduct electric current absorbed by the matrix layer to a located outside of the matrix layer, which may avoid or reduce damage to the matrix layer caused by lightning strikes and other sources of electric current into the matrix layer.

In one or more embodiments, a laminate assembly is provided that includes a matrix layer and elongated, continuous strips of a conductive alloy. The matrix layer has opposite first and second sides connected by opposite first and second edges. Each of the first and second edges extends from the first side of the matrix layer to the opposite second side of the matrix layer. The elongated, continuous strips of the conductive alloy are disposed in the matrix layer between the first and second sides of the matrix layer. The elongated continuous strips continuously extend through the matrix layer from the first edge to the opposite second edge.

Optionally, the elongated, continuous strips are formed from a shape memory alloy as the conductive alloy.

Optionally, at least one of the elongated, continuous strips of the conductive alloy is bowed toward the first side of the matrix layer.

Optionally, the elongated, continuous strips of the conductive alloy absorb energy of one or more impacting bodies striking the matrix layer and prevent the one or more impacting bodies passing through the matrix layer.

Optionally, the elongated, continuous strips of the conductive alloy are conductive and configured to conduct electric current absorbed by the matrix layer.

Optionally, the elongated, continuous strips of the conductive alloy absorb vibrations of the matrix layer.

Optionally, the matrix layer is formed from a foam material and/or a resin material.

Optionally, the matrix layer and the elongated, continuous strips are disposed on a vehicle.

Optionally, the laminate assembly further includes fibers disposed in the matrix layer with the continuous, elongated strips. The fibers are formed from carbon, glass, aramid, and/or basalt.

Optionally, the laminate assembly further includes a fiber-reinforced polymer layer disposed on the first side of the matrix layer. The fiber-reinforced polymer layer includes fibers formed from carbon, glass, aramid, and/or basalt.

Optionally, each of the continuous, elongated strips has outer dimensions that are significantly longer in first and second orthogonal directions than in a third orthogonal direction.

In one or more embodiments, a method of creating a laminate assembly is provided that includes disposing elongated, continuous strips of a conductive alloy in a resin material. The method also includes solidifying the resin material to form a matrix layer having opposite first and second sides connected by opposite first and second edges. Each of the first and second edges extends from the first side of the matrix layer to the opposite second side of the matrix layer. The elongated, continuous strips of the conductive alloy are disposed between the first and second sides of the matrix layer and continuously extend through the matrix layer from the first edge to the opposite second edge.

Optionally, the method further includes forming the elongated, continuous strips of the conductive alloy from a shape memory alloy.

Optionally, at least one of the elongated, continuous strips of the conductive alloy is disposed in the resin material in a curved state such that the at least one strip is bowed toward the first side of the matrix layer.

Optionally, the elongated, continuous strips of the conductive alloy are disposed in the resin material such that one or more ends of the strips extends outside of the matrix layer to conduct electric current absorbed by the matrix layer to a location outside of the matrix layer.

In one or more embodiments, a laminate assembly is provided that includes a matrix layer and non-planar elements of a shape memory alloy. The matrix layer has a thickness that extends from a first side of the matrix layer to a second side of the matrix layer that is opposite the first side. The non-planar elements of the shape memory alloy are disposed in the matrix layer between the first and second sides of the matrix layer. The non-planar elements of the shape memory alloy are coiled and/or curved to absorb energy of one or more impacting bodies striking the matrix layer.

Optionally, the non-planar elements include strips that extend a length from a first end to an opposite second end along a first orthogonal direction and a width from a first edge to an opposite second edge along a second orthogonal direction. The strips are bowed along the length such that a middle segment of a respective one of the strips located halfway between the first end and the second end of the respective strip is located closer to the first side of the matrix layer than a proximity of the first and second ends of the respective strip to the first side of the matrix layer.

Optionally, the non-planar elements include strips that extend a length from a first end to an opposite second end along a first orthogonal direction and a width from a first edge to an opposite second edge along a second orthogonal direction. The strips are bowed along the width such that a midline of a respective one of the strips located halfway between the first edge and the second edge of the respective strip and extending along the length of the respective strip from the first end to the second end is located closer to the first side of the matrix layer than a proximity of the first and second edges of the respective strip to the first side of the matrix layer.

Optionally, the non-planar elements include coil springs that are helically oriented along respective central axes. The central axes are orthogonal to the first and second sides of the matrix layer.

Optionally, the non-planar elements include disc springs that are oriented 10 respective central axes. The central axes are orthogonal to the first and second sides of the matrix layer.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are example embodiments.

Many other embodiments will be apparent to those of ordinary skill in the art upon reviewing the above description. The scope of the subject matter described herein should, therefore, be determined with reference to the appended claims, along with the full scope of equivalents to which such claims are entitled. In the appended claims, the 5 terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to 10 be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

I claim:

1. A laminate assembly comprising:
   a matrix layer having opposite first and second sides connected by opposite first and second edges, each of the first and second edges extending from the first side of the matrix layer to the opposite second side of the matrix layer; and
   elongated, continuous strips of a conductive alloy having a third edge spaced from and opposing a fourth edge, and a longitudinal midline disposed halfway therebetween the third and fourth edge, the elongated continuous strips disposed in the matrix layer between the first and second sides of the matrix layer, the elongated continuous strips continuously extending through the matrix layer from the first edge to the opposite second edge, wherein the longitudinal midline of each respective elongated continuous strip is located closer to the first side of the matrix layer than a proximity of the third and fourth edges of the respective elongated continuous strip to the first side.

2. The laminate assembly of claim 1, wherein the elongated, continuous strips are formed from a shape memory alloy as the conductive alloy.

3. The laminate assembly of claim 1, wherein at least one of the elongated, continuous strips of the conductive alloy is bowed toward the first side of the matrix layer.

4. The laminate assembly of claim 1, wherein the elongated, continuous strips of the conductive alloy absorb an impact energy of one or more impacting bodies striking the matrix layer and prevent the one or more impacting bodies passing through the matrix layer.

5. The laminate assembly of claim 1, wherein the elongated, continuous strips of the conductive alloy are conductive and configured to conduct electric current absorbed by the matrix layer.

6. The laminate assembly of claim 1, wherein the elongated, continuous strips of the conductive alloy absorb vibrations of the matrix layer.

7. The laminate assembly of claim 1, wherein the matrix layer is formed from one or more of a foam material or a resin material.

8. The laminate assembly of claim 1, wherein the matrix layer and the elongated, continuous strips are disposed on a vehicle.

9. The laminate assembly of claim 1, further comprising fibers disposed in the matrix layer with the continuous, elongated strips, the fibers being formed from one or more of carbon, glass, aramid, or basalt.

10. The laminate assembly of claim 1, further comprising a fiber-reinforced polymer layer disposed on the first side of the matrix layer, the fiber-reinforced polymer layer including fibers formed from one or more of carbon, glass, aramid, or basalt.

11. The laminate assembly of claim 1, wherein each of the continuous, elongated strips has outer dimensions that are significantly longer in first and second orthogonal directions than in a third orthogonal direction.

12. A method of creating a laminate assembly, the method comprising:
disposing elongated, continuous strips of a conductive alloy having a third edge spaced from and opposing a fourth edge, and a longitudinal midline disposed halfway therebetween the third and fourth edge, in a resin material;
and
solidifying the resin material to form a matrix layer having opposite first and second sides connected by opposite first and second edges, each of the first and second edges extending from the first side of the matrix layer to the opposite second side of the matrix layer, wherein the elongated, continuous strips of the conductive alloy are disposed between the first and second sides of the matrix layer and continuously extend through the matrix layer from the first edge to the opposite second edge, and wherein the longitudinal midline of each respective elongated continuous strip is located closer to the first side of the matrix layer than a proximity of the third and fourth edges of the respective elongated continuous strip to the first side.

13. The method of claim 12, further comprising forming the elongated, continuous strips of the conductive alloy from a shape memory alloy.

14. The method of claim 12, wherein at least one of the elongated, continuous strips of the conductive alloy is disposed in the resin material in a curved state such that the at least one strip is bowed toward the first side of the matrix layer.

15. The method of claim 12, wherein the elongated, continuous strips of the conductive alloy are disposed in the resin material such that one or more ends of the strips extends outside of the matrix layer to conduct electric current absorbed by the matrix layer to a location outside of the matrix layer.

16. A laminate assembly comprising:
a matrix layer having a thickness that extends from a first side of the matrix layer to a second side of the matrix layer that is opposite the first side; and
non-planar elements of a shape memory alloy disposed in the matrix layer between the first and second sides of the matrix layer, wherein the non-planar elements of the shape memory alloy define a respective closed shape having central opening and are curved to absorb an impact energy of one or more impacting bodies striking the matrix layer.

17. The laminate assembly of claim 16, wherein the non-planar elements include strips that extend a length from a first end to an opposite second end along a first orthogonal direction and a width from a first edge to an opposite second edge along a second orthogonal direction, wherein the strips are bowed along the length such that a middle segment of a respective one of the strips located halfway between the first end and the second end of the respective strip is located closer to the first side of the matrix layer than a proximity of the first and second ends of the respective strip to the first side of the matrix layer.

18. The laminate assembly of claim 16, wherein the non-planar elements include strips that extend a length from a first end to an opposite second end along a first orthogonal direction and a width from a first edge to an opposite second edge along a second orthogonal direction, wherein the strips are bowed along the width such that a midline of a respective one of the strips located halfway between the first edge and the second edge of the respective strip and extending along the length of the respective strip from the first end to the second end is located closer to the first side of the matrix layer than a proximity of the first and second edges of the respective strip to the first side of the matrix layer.

19. The laminate assembly of claim 16, wherein the non-planar elements include disc springs that are oriented along respective central axes, the central axes being orthogonal to the first and second sides of the matrix layer.

* * * * *